United States Patent Office 2,950,099
Patented Aug. 23, 1960

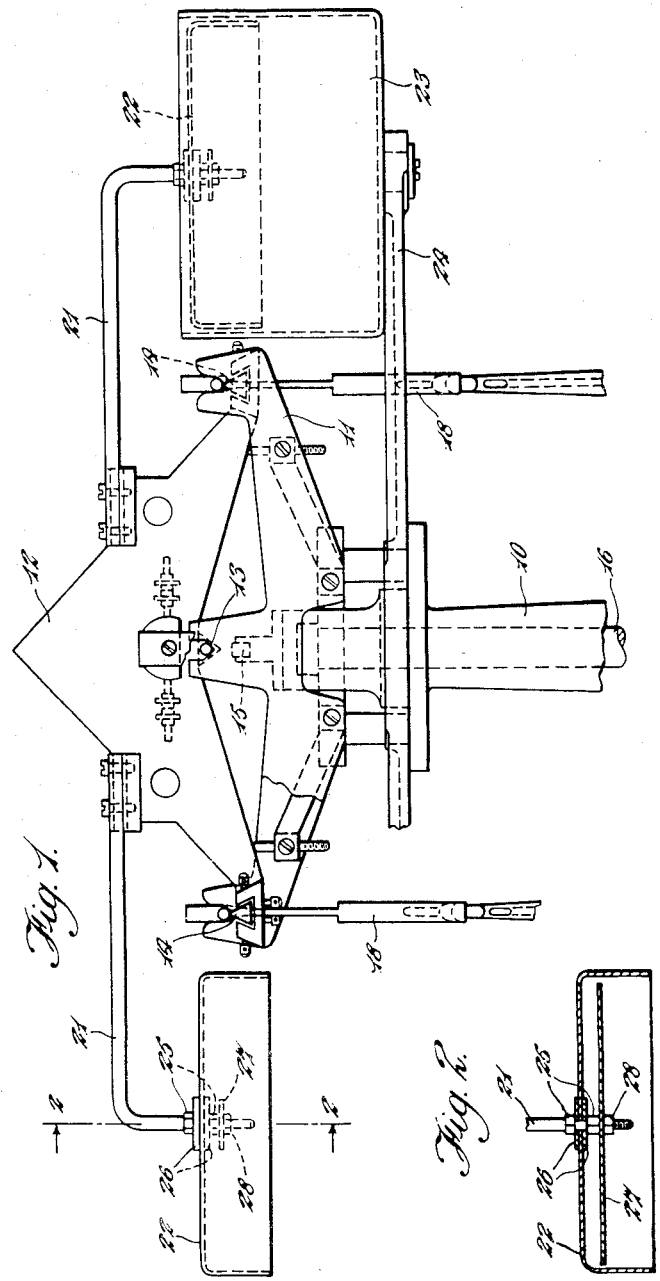
INVENTORS
FRANCIS HODSMAN
FRANK ARTHUR CHAPPELL
BY Toulmin & Toulmin
ATTORNEYS

2,950,099

ANALYTICAL OR FINE BALANCES

George Francis Hodsman and Frank Arthur Chappell, St. Mary Cray, Orpington, England, assignors to L. Oertling Limited, St. Mary Cray, Orpington, England, a British company Filed Sept. 25, 1958, Ser. No. 763,391

Claims priority, application Great Britain Oct. 19, 1957

4 Claims. (Cl. 265—54)

This invention relates to balances for analytical and other fine weighing purposes. In such balances, the sensitivity of the beam is determined by the weight of the beam, the distance between the fulcrum of the beam and the point of suspension of the load pan or pans and the distance between the beam fulcrum and the center of gravity of the beam. Changes in the ambient temperature can affect these quantities and thus result in an observable effect on the sensitivity of the beam.

It is desirable that the variation of sensitivity of the beam with temperature should be eliminated or kept as small as possible, and the object of the present invention is to provide an arrangement of the balance beam assembly to achieve this end.

According to the present invention, in a balance for fine weighing comprising a beam adapted to be brought to an equilibrium position by the application or removal of weights, there is or are attached to the said beam an element or a number of elements deformable with temperature variation in such a manner that the center of gravity of the said element or elements moves vertically as a result of a temperature change to produce a change in sensitivity of the beam in the opposite sense to that induced in the said beam by the temperature change, whereby the sensitivity of the beam is maintained substantially constant.

Two deformable elements may be provided each comprising a bi-metallic strip mounted at its center on the balance beam, the two bi-metallic strips being mounted on opposite sides of the beam fulcrum and equidistant therefrom.

The bi-metallic strips may be so mounted as to extend transversely relative to the vertical plane containing the beam. The balance may include damping pistons on the beam operating in cylinders carried by the fixed structure of the balance, the bi-metallic strips being mounted on the said pistons.

The invention is hereinafter described with reference to the accompanying drawings, in which:

Figure 1 is a partial front elevation, with parts broken away, of one form of balance embodying the invention; and Figure 2 is a section on the line 2—2 of Figure 1.

Referring to the drawings, the pillar 10 of the balance carries at its upper end a bearing plane 15, and incorporates bushes serving as bearings for a vertically slidable rod 16 which is movable by control means (not shown) in the base of the balance. An arrestment frame 11 is attached to the upper end of the rod 16 and is held in the raised position in which it is shown in Figure 1, when the balance is not in use, to support the balance beam 12 and hangers 18, 18 for the scale pans (not shown). The beam 12 has fixed to it a central downwardly-facing knife edge 13 and two upwardly-facing knife edges 14, 14 one adjacent each end thereof, the knife edges 14, 14 co-operating with downwardly-facing bearing planes (not shown) on the hangers 18, 18. When the arrangement frame 11 is lowered by operation of the rod 16, the central knife edge 13 engages the bearing plane 15, after which the knife edges 14, 14 engage the bearing planes on the hangers 18, 18 the frame continuing to move downwardly until the beam 12 is free to swing about the knife edge 13.

Two rods 21, 21 carried by the beam 12 and extending longitudinally beyond the ends thereof are bent downwardly at their outer end to support pistons 22, 22 of inverted cup shape working in cup-shaped cylinders one of which is shown at 23 in Figure 1, the cylinders 23 being carried by a bar 24 fixed to the pillar 10.

The down-turned ends of the rods 21 are screw-threaded, the pistons 22 being clamped thereon by nuts 25 and washers 26, and, inside each piston there is mounted a bi-metallic strip 27 extending transversely relative to the vertical plane containing the beam 12, the strips 27 being screwed to the rods 21 by nuts 28 clamping them against the lower clamping nuts for the pistons. Each of the bi-metallic strips 27 is mounted at its center so that its ends are free to move up and down with changes in temperature.

The beam assembly of the balance includes the beam 12, knife edges 13, 14, rods 21, pistons 22, and bi-metallic strips 27. As the ambient temperature changes, the bi-metallic strips bend and consequently the center of gravity of the beam assembly moves vertically, the said strips being so arranged that their direction of bending changes the sensitivity of the beam in the opposite sense to that in which it would change in the absence of the said strips. By suitably selecting the dimensions of the strips, and properly arranging their mounting, the sensitivity of the balance is therefore maintained substantially constant despite changes in the ambient temperature.

The particular arrangement of bi-metallic strips described with reference to the drawings is only one example of the manner in which the invention can be carried out. A single bi-metallic strip may be used with its center in the vertical plane containing the fulcrum of the beam, or any grouping of bi-metallic strips which is symmetrical about that vertical plane.

While the invention has been particularly described with reference to a balance including a beam supporting scale pans at both ends, it is also applicable to other forms of balance such as, for example, those in which the beam has a fixed weight at one end and a scale pan and weight carrier at the other, a balance being achieved when an article is placed in the scale pan by removing weights from the carrier.

We claim:

1. In a balance for fine weighing, the combination of a balance beam, load pans on said balance beam so that the application and removal of weights with respect to said load pans will bring the balance beam to equilibrium position, and an element deformable in response to temperature variations attached to said balance beam and carried thereby, said element being so attached to said balance beam that the center of gravity of said element moves vertically in response to temperature variations to produce a change in the sensitivity of the balance beam in a sense opposite to that induced in said beam by a temperature variation whereby the sensitivity of the balance beam is maintained substantially constant irrespective of temperature variations.

2. A balance, as claimed in claim 1 wherein a deformable element is mounted on each side of the beam fulcrum and equi-distant therefrom, each of said deformable elements comprising a bi-metallic strip mounted on its center on said balance beam.

3. A balance according the claim 2, wherein the bi-metallic strips are so mounted as to extend transversely relative to the vertical plane containing the beam.

4. A balance as claimed in claim 3 and further comprising a pair of cylinders mounted on a fixed structure of the balance, damping pistons on said balance beam and operating within said cylinders, said bi-metallic strips being mounted on said pistons within said cylinders.

References Cited in the file of this patent

UNITED STATES PATENTS

| | | |
|---|---|---|
| 2,191,635 | Battenberg | Feb. 27, 1940 |
| 2,334,242 | Bohannan | Nov. 16, 1943 |
| 2,584,950 | Weckerly | Feb. 5, 1952 |